United States Patent
Kelley

(10) Patent No.: US 6,467,028 B1
(45) Date of Patent: Oct. 15, 2002

(54) MODULATED CACHE FOR AUDIO ON THE WEB

(75) Inventor: Edward E. Kelley, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/392,770

(22) Filed: Sep. 7, 1999

(51) Int. Cl.[7] .............................................. G06F 12/00
(52) U.S. Cl. .................... 711/129; 710/56; 709/215; 709/226; 345/961; 711/133; 711/153; 711/170
(58) Field of Search ................... 345/961, 965, 345/966, 968, 969, 970; 709/104, 203, 215, 226; 710/52, 53, 56, 57; 711/118, 129, 133, 134, 147, 148, 153, 170, 171, 172, 173

(56) References Cited

U.S. PATENT DOCUMENTS

| 4,947,319 A | * | 8/1990 | Bozman ...................... 709/105 |
|---|---|---|---|
| 5,586,264 A | * | 12/1996 | Belknap et al. .............. 709/231 |
| 5,721,874 A | * | 2/1998 | Carnevale et al. ........... 711/171 |
| 5,764,908 A | * | 6/1998 | Shoji et al. .................. 709/203 |
| 5,787,472 A | * | 7/1998 | Dan et al. .................... 711/112 |
| 5,815,662 A | * | 9/1998 | Ong ....................... 365/230.01 |
| 5,873,100 A | | 2/1999 | Adams et al. |
| 5,878,223 A | | 3/1999 | Becker et al. |
| 5,898,833 A | | 4/1999 | Kidder |
| 6,061,504 A | * | 5/2000 | Tzelnic et al. ............... 709/203 |
| 6,085,216 A | * | 7/2000 | Huberman et al. ......... 709/102 |
| 6,167,496 A | * | 12/2000 | Fechner ....................... 711/100 |
| 6,230,200 B1 | * | 5/2001 | Forecast et al. ............. 709/219 |
| 6,263,361 B1 | * | 7/2001 | Hoyer et al. ................ 709/203 |
| 6,282,613 B1 | * | 8/2001 | Hsu et al. .................... 711/118 |
| 6,298,386 B1 | * | 10/2001 | Vahalia et al. .............. 709/203 |

* cited by examiner

Primary Examiner—Matthew Kim
Assistant Examiner—Christian P. Chace
(74) Attorney, Agent, or Firm—DeLio & Peterson LLC; Peter W. Peterson; Jay H. Anderson

(57) ABSTRACT

The present invention discloses a method and apparatus for viewing and modifying the cache when accessing and processing audio file data from a server. By modifying the cache during transmission of the audio file data such that the cache is never completely depleted of the data, superior sound quality is achieved and without significant gaps in transmission.

30 Claims, 5 Drawing Sheets

| URL 1 | TIME RANGE | CACHE SIZE |
| --- | --- | --- |
| URL 2 | TIME RANGE | CACHE SIZE |
| URL 3 | TIME RANGE | CACHE SIZE |
| URL ..... | TIME RANGE | CACHE SIZE |

FIG. 4

MODULATED CACHE FOR AUDIO ON THE WEB

BACKGROUND OF THE INVENTION

1. Field of the Invention

This invention relates to the field of multimedia computer applications, and more particularly to improving the listening quality of an audio file accessed from a server.

2. Description of Related Art

The Internet has opened worlds to millions of people and the fields for multi-faceted information and education thereon are enormous including new means of multi-media entertainment. People with access to the Internet via web browsers can now view videos and listen to songs directly from their personal computers. However, one problem with accessing audio files is that there are frequent gaps in the audio reception. The gaps are typically due to network traffic which may differ for each audio transmission and may even depend on the time of day.

Existing systems attempt to solve this problem by delaying transmission of the audio file and storing an initial portion of the incoming audio file data. By accessing the audio file from the cache while continually receiving the audio file data into the cache, it is hoped that the cache will not be depleted while the user is listening to the audio file. Depletion of the cache causes gaps or breaks in the transmission and the user can detect the "skips" in the transmission.

It would be helpful to the user to modify the cache so that upon detecting the near depletion of data in the cache, the user may modify the cache thereby substantially reducing or eliminating the gaps in transmission. Existing systems fall short in providing superior sound quality when listening to an audio file accessed from the Internet or other server. Currently, existing systems do not allow the user to view the size of the cache, modify the cache size, provide different caches for different times of day depending on network traffic, or provide different caches for different sources of transmission.

Bearing in mind the problems and deficiencies of the prior art, it is therefore an object of the present invention to provide a means of listening to an audio file accessed via a server, e.g. the Internet, such that superior sound quality is achieved without significant gaps in transmission.

It is another object of the present invention to provide a method and apparatus for modifying the cache size of an audio transmission accessed via a server.

A further object of the invention is to provide a method and apparatus for viewing the cache size during an audio transmission accessed via a server.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, a method of facilitating an audio broadcast via the Internet, the audio broadcast being performed by transmitting information to a memory cache having a storage capacity in a user computer, the method comprising the steps of: (a) informing the user of the storage capacity; and (b) altering the storage capacity in accordance with an instruction from the user such that information corresponding to a complete audio broadcast is accommodated in the cache.

In another aspect, the present invention is directed to a method of receiving an audio file via a server by a user computer comprising the steps of: (a) allocating an estimated amount of cache for the audio file; (b) receiving the audio file; (c) adjusting the estimated amount of cache for the audio file to an actual amount of cache; and (d) processing the audio file without substantial breaks in the transmission of the audio file. Preferably, step (c) may comprise adjusting the estimated amount of cache for the audio file such that a rate of receiving the audio file data is substantially similar to a rate of processing the data. Step (c) may further include the step of decreasing or increasing the amount of cache when a rate of receiving the audio file data is lower than or greater than a rate of processing the data.

The method may further include the step of creating a cache size table, the cache size table comprising a uniform resource locator, the actual amount of cache, and a time range for each selected audio file. The estimated amount of cache for the audio file may be compared with the actual amount of cache in the cache size table. The estimated amount of cache for the audio file may be modified such that it is substantially equal to the actual amount of cache in the cache size table for the selected audio file. A cache viewer may be provided for viewing the estimated amount of cache for the audio file and an amount of the audio file data received.

In yet another aspect, the present invention is directed to a method of receiving an audio file via a server comprising the steps of: (a) providing a user computer linked to the server; (b) accessing an audio file on the server; (c) creating a cache size table comprising a uniform resource locator, a time range, and an actual amount of cache required, an entry corresponding to the audio file entered into the cache size table upon accessing the audio file; (d) allocating an amount of cache on a storage capacity of the user computer for the audio file; (e) processing the audio file; and (f) adjusting the amount of cache to an actual amount of cache such that a rate of accessing the audio file is substantially equal to a rate of processing the audio file to provide continuous transmission of the audio file to the user computer.

The method may further include the step of providing a cache viewer for viewing the amount of cache allocated in step (d) and the actual amount of cache being processed in step (e). Upon viewing the cache viewer, the amount of cache allocated in step (d) may be adjusted to be substantially equal to the actual amount of cache being processed.

In still yet another aspect, the present invention is directed to a method of controlling cache size during receipt of an audio data file by a user computer from a server comprising the steps of: (a) predetermining an amount of cache needed for the audio data file; (b) creating a cache size table comprising entries for each audio data file accessed by the user computer; (c) receiving and processing the audio data file; and (d) modifying the amount of cache needed for the audio data file during step (c) such that a rate of receiving the audio data file is substantially equal to a rate of processing the audio data file. In step (b) multiple entries may be entered for a same data file having different time ranges dependent on a time of day. The method may further include the step of providing a cache viewer for viewing the amount of cache predetermined in step (a) and the actual amount of cache being received during step (c).

In a further aspect, the present invention is directed to a cache size table for storing data received during an audio file transmission comprising a uniform resource locator; a cache size amount; and a time range.

In yet a further aspect, the present invention is directed to a program storage device readable by a machine, tangibly embodying a program of instructions executable by the machine to perform method steps for a method of receiving an audio file via a server, the method steps comprising: (a) allocating an estimated amount of cache for the audio file; (b) adjusting the estimated amount of cache to an actual amount of cache; and (c) transmitting the audio file through a speaker linked to the machine such that a user of the machine may listen to the audio file without substantial breaks in transmission.

In still yet a further aspect, the present invention is directed to a program storage device readable by a machine, tangibly embodying a program of instructions executable by the machine to perform method steps for a method of: (a) allocating an estimated amount of cache on a memory storage of the machine; (b) creating a cache size table comprising a uniform resource locator, a time range, and an actual amount of cache required to store the audio file, an entry corresponding to the audio file entered into the cache size table upon accessing the audio file; (c) adjusting the estimated amount of cache to the actual amount of cache such that a rate of accessing the audio file is substantially equal to a rate of processing the audio file; and (d) providing continuous transmission of the audio file to a user of the machine.

In still a further aspect, the present invention is directed to a program storage device readable by a machine, tangibly embodying a program of instructions executable by the machine to perform method steps for a method of receiving an audio file by a server, the method steps comprising: (a) providing a cache viewer on a screen linked to the machine; (b) allocating an estimated amount of cache for the audio file, the estimated amount of cache visible via the cache viewer; (c) creating a cache size table comprising a uniform resource locator, a time range and an actual amount of cache pertaining to the audio file; (d) displaying an actual amount of cache being received by the machine; (e) adjusting the estimated amount of cache to the actual amount of cache such that a rate of accessing the audio file is substantially equal to a rate of processing the audio file; and (f) providing substantially continuous transmission of the audio file to a user.

In still a further aspect, the present invention is directed to a web browser stored on a computer comprising a means for accessing an audio file, the audio file stored on a server linked to the computer; a means for reserving an estimated amount of cache storage for the audio file; a means for adjusting the estimated amount of cache storage to an actual amount of cache storage for the audio file such that the cache storage is not depleted when accessing the audio file; a means for viewing the cache storage prior to adjusting the cache storage; a means for creating a cache table comprising a uniform resource locator, a time range and an actual amount of cache storage pertaining to the audio file; a means for comparing an entry for the audio file previously entered into the cache table with the estimated amount of cache storage such that the estimated amount of cache storage may be adjusted to provide continuous transmission of the audio file; and a means for transmitting the audio file to a listener.

In a final aspect, the present invention is directed to a program storage device readable by a machine, tangibly embodying a program of instructions executable by the machine to perform method steps for a method of controlling cache size during receipt of an audio data file, the method steps comprising: (a) allocating an estimated amount of cache for the audio data file; (b) creating a cache size table comprising entries for each audio data file accessed by the machine; and (c) modifying the estimated amount of cache to an actual amount of cache such that a rate of accessing the audio file data is substantially equal to a rate of receiving and processing the audio file data.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 4 is a schematic representation of a cache size table of the present invention.

DESCRIPTION OF THE PREFERRED EMBODIMENT(S)

Figure 1:
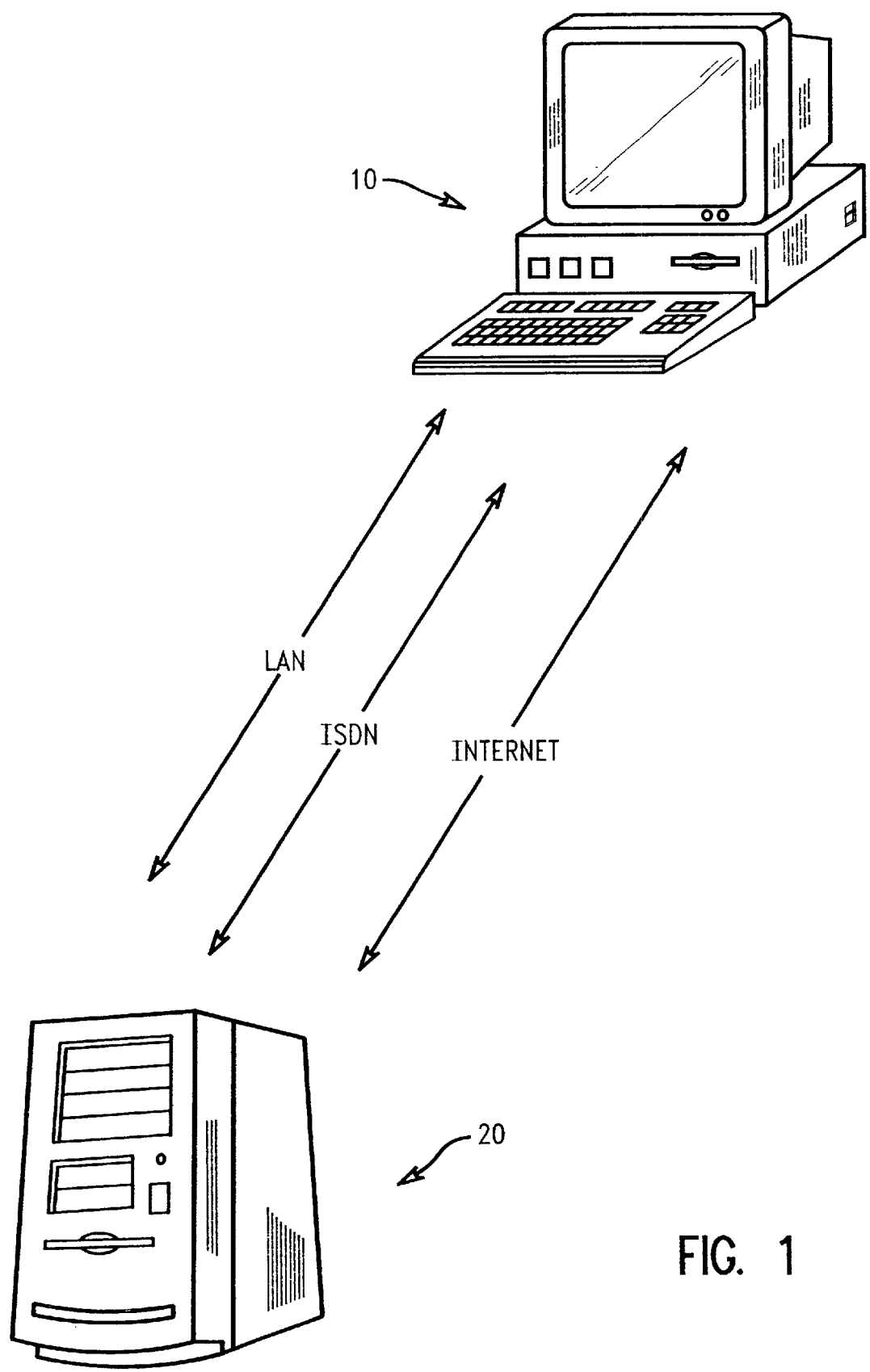
FIG. 1 is a schematic representation of a computer system for use in conjunction with the present invention.

In describing the preferred embodiment of the present invention, reference will be made herein to FIGS. 1–5 of the drawings in which like numerals refer to like features of the invention. Features of the invention are not necessarily shown to scale in the drawings.

The present invention allows a user to control the cache size of an audio file, view the cache size when receiving an audio file transmission, and the ability to store a different cache size for the same transmission depending on the time of day. The cache size may be modified by increasing or decreasing the size at any time during transmission of the audio file to optimize transmission and significantly reducing any gaps when listening to the audio file. Thus, listening quality is greatly improved.

A user desiring to listen to an audio file, e.g. a song, may access the audio file from a program storage device such as a personal computer 10 or via the personal computer linked to a remote or local server 20, e.g. the Internet, a local area network (LAN) server, or a wide area network (WAN) server, as illustrated in FIG. 1. The user's personal computer 10 is linked to a server 20 by telephone lines or specialized communication channels such as an Integrated Services Digital Network (ISDN), or maybe interconnected via the Internet to other users as well. In order to listen to an audio file, it is preferable for the personal computer system to have a speaker.

Figure 2:
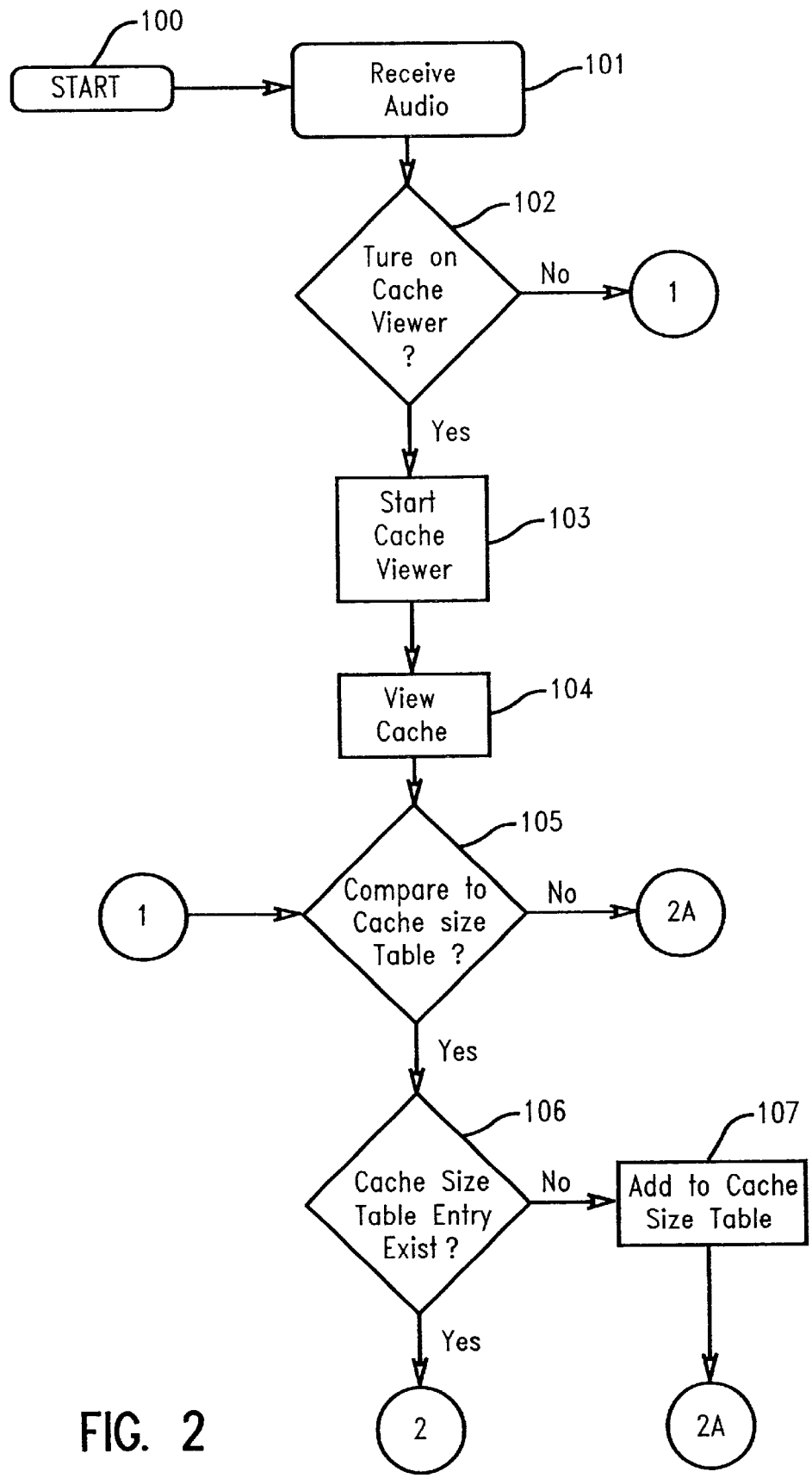
FIG. 2 is a flow diagram illustrating a method of the present invention for modulating the cache size of an audio file as it is received from a server.
Figure 3:
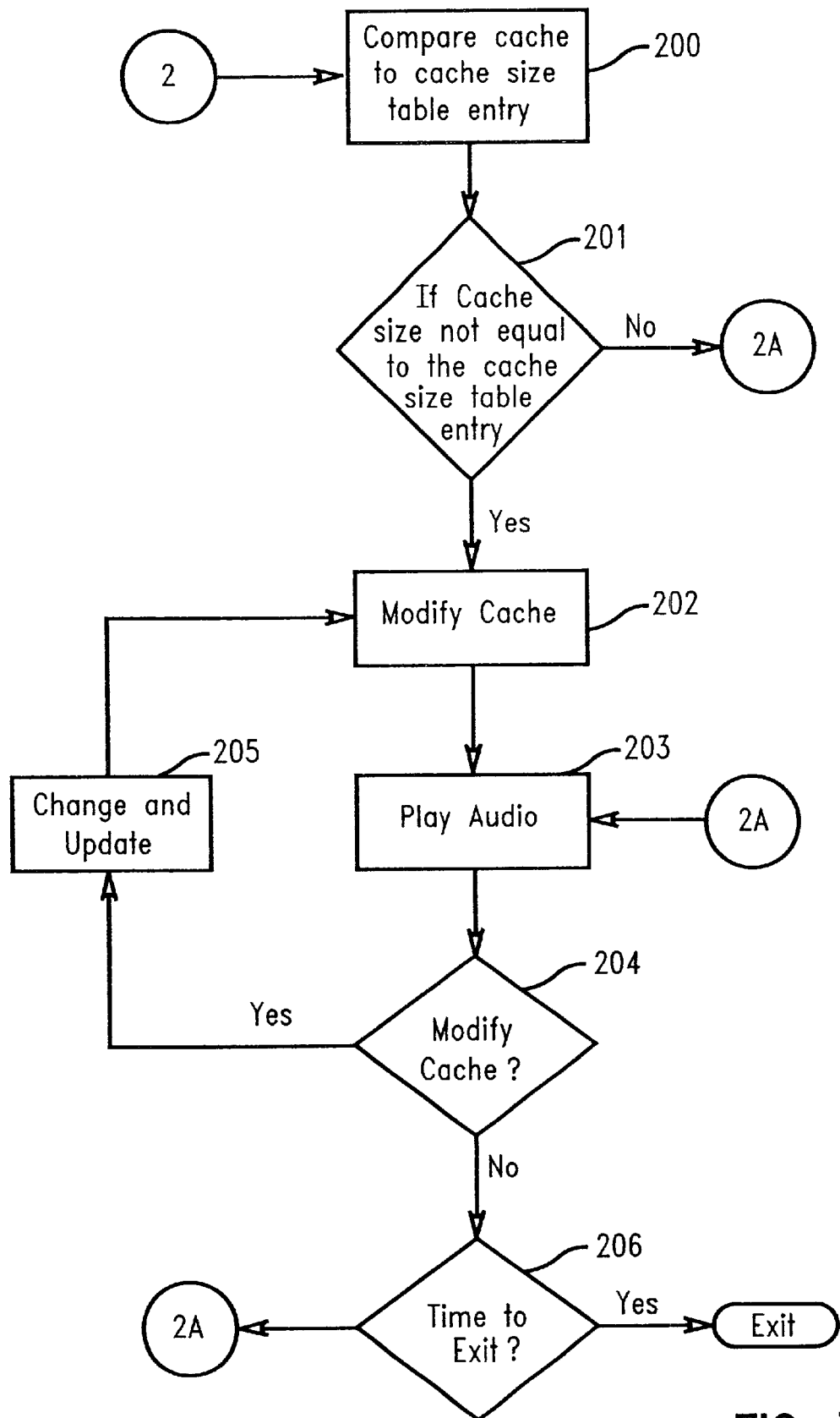
FIG. 3 is a flow diagram illustrating a method of the present invention for comparing the cache sizes of an audio file in the cache size table of the present invention.

FIG. 2 illustrates a method of the present invention for modulating the cache size of an audio file as it is received from a server. The process starts at step 100 when the user selects an audio file to be received by their personal computer which is linked to a server as represented in FIG. 1. The user has selected an audio uniform resource locator (URL) via the personal computer through a web browser. Initially, the web browser allocates an estimated amount of cache for the selected audio data file and begins to receive 101 the audio file data into the estimated amount of cache.

Figure 5:
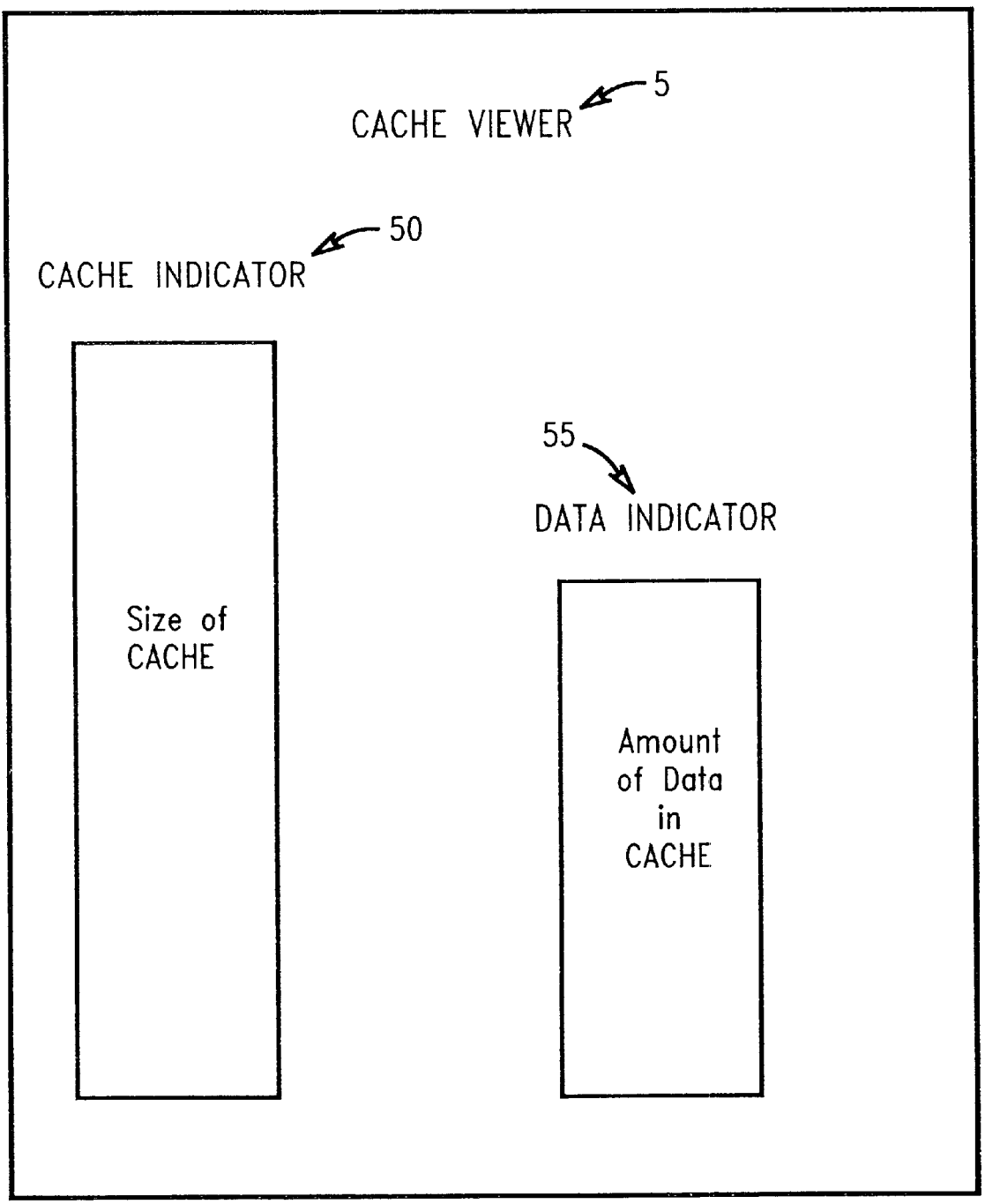
FIG. 5 is a schematic representation of a cache viewer of the present invention.

As the audio data file is being received, the user determines whether or not to turn on the cache viewer 102. The cache viewer, schematically represented in FIG. 5, is a window that displays the amount of audio file data in the web browser cache. The cache viewer may be located on a portion of the display screen linked to the user's personal computer. The cache viewer may comprise a cache indicator 50 which varies with the amount of allocated cache, and a data indicator 55 which varies with the amount of data being received. If the cache is empty, there is typically a delay when listening to the audio as the cache is receiving more data. It is important to note that only when there is enough audio data in the cache that continuous reception is possible and the audio file can be listened to without any significant gaps in reception. If the user starts the cache viewer 103, the cache viewer 5 is displayed 104 to determine whether the cache initially estimated for the incoming audio file should be modified by increasing or decreasing the allocated cache amount.

In determining whether or not to modify the cache size, it is first determined 105 whether there has been an entry in the cache size table for the selected URL and the time range at which the audio file is accessed. The cache size table, illustrated in FIG. 4, is made up of entries corresponding to each audio file accessed by the user via the web browser. The entries comprise of the URLs for the selected audio file, the time range delineating the begin time and end time that the audio file is listened to, and the cache size required to store the audio file data.

Whether a cache size table entry exists for the selected audio file is then determined 106. An entry for the cache size table is entered when the audio file is first selected by the user. Thus, if an entry in the cache size table does not exist, it is added to the table 107 and the process is exited. If the cache size table contains an entry for the selected URL from a previous access time, the estimated cache amount is compared 200 to the cache size entry in the table.

In step 201, if the estimated cache amount is not equal to the cache size entered in the cache size table, the cache size is modified 202 or if no modification is required, the audio file is played 203. The user modifies 202 the estimated cache size to an actual cache size so that the actual cache size is equal to the entry for the URL in the cache size table. Thereafter, the audio file is played 203.

As the user is listening to the audio file, the user may again modify 204 the cache. The entry for the selected URL in the cache size table within the time range may be changed and updated 205 to include the estimated size of the cache necessary to contain sufficient audio file data so the audio file plays without any significant gaps. Once the cache has been modified, the process may be exited 206.

A preferred implementation of the present invention is a software program used in conjunction with a web browser incorporating the program source code or as a plug-in (a file containing data used to alter, enhance, or extend the operation of a parent application program). Typical web browsers, including Netscape Navigator™ available from Netscape Communications Corp., which would support a plug-in comprise well known program source code which contains the means for accessing and transmitting an audio file to a listener. The program source code may be encoded in a tangible media which creates the means for causing the computer to perform the various steps of the present invention.

The present invention achieves the objects recited above by providing a method and apparatus for viewing and modifying the cache when accessing and processing audio file data from a server. By modifying the cache during transmission of the audio file data such that the cache is never completely depleted of the data, superior sound quality is achieved and there are no significant gaps in transmission.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of facilitating an audio broadcast via the Internet, the audio broadcast being performed by transmitting information to a memory cache having a storage capacity in a user computer, the method comprising the steps of:
   (a) informing the user of the storage capacity; and
   (b) altering the storage capacity in accordance with an instruction from the user such that information corresponding to a complete audio broadcast is accommodated in the cache.

2. A method of receiving an audio file via a server by a user computer comprising the steps of:
   (a) allocating an estimated amount of cache for the audio file;
   (b) receiving the audio file;
   (c) adjusting the estimated amount of cache for the audio file to an actual amount of cache; and
   (d) processing the audio file without breaks in the transmission of the audio file.

3. The method of claim 2 wherein step (c) comprises adjusting the estimated amount of cache for the audio file such that a rate of receiving the audio file data is substantially similar to a rate of processing the data.

4. The method of claim 2 wherein step (c) may further include the step of decreasing the amount of cache when a rate of receiving the audio file data is lower than a rate of processing the data.

5. The method of claim 2 wherein step (c) may further include the step of increasing the amount of cache when a rate of receiving the audio file data is greater than a rate of processing the data.

6. The method of claim 2 further including the step of creating a cache size table, said cache size table comprising a uniform resource locator, the actual amount of cache, and a time range for each selected audio file.

7. The method of claim 6 further including the step of comparing the estimated amount of cache for the audio file with the actual amount of cache in said cache size table.

8. The method of claim 7 further including the step of modifying the estimated amount of cache for the audio file such that it is substantially equal to the actual amount of cache in said cache size table for the selected audio file.

9. The method of claim 2 further including the step of playing said audio file.

10. The method of claim 2 further including the step of providing a cache viewer for viewing the estimated amount of cache for the audio file and an amount of the audio file data received.

11. The method of claim 2 wherein step (b) comprises receiving the audio file data for a second transmission wherein the audio file data has an entry in a cache size table such that the actual amount of cache is known.

12. A method of receiving an audio file via a server comprising the steps of:
   (a) providing a user computer linked to the server;
   (b) accessing an audio file on the server;
   (c) creating a cache size table comprising a uniform resource locator, a time range, and an actual amount of cache required, an entry corresponding to said audio file entered into said cache size table upon accessing said audio file;
   (d) allocating an amount of cache on a storage capacity of said user computer for said audio file;
   (e) processing said audio file; and
   (f) adjusting said amount of cache to an actual amount of cache such that a rate of accessing said audio file is substantially equal to a rate of processing said audio file to provide continuous transmission of said audio file to said user computer.

13. The method of claim 12 wherein step (b) comprises accessing an audio file on an Internet server.

14. The method of claim 12 further including the step of providing a cache viewer for viewing said amount of cache allocated in step (d) and the actual amount of cache being processed in step (e).

15. The method of claim 14 wherein upon viewing said cache viewer, the amount of cache allocated in step (d) may be adjusted to be substantially equal to the actual amount of cache being processed.

16. A method of controlling cache size during receipt of an audio data file by a user computer from a server comprising the steps of:
   (a) predetermining an amount of cache needed for the audio data file;
   (b) creating a cache size table comprising entries for each audio data file accessed by the user computer;
   (c) receiving and processing the audio data file; and
   (d) modifying said amount of cache needed for the audio data file during step (c) such that a rate of receiving the audio data file is substantially equal to a rate of processing the audio data file.

17. The method of claim 16 wherein in step (b) an entry in said cache size table comprises a uniform resource locator, an actual amount of cache, and a time range for each data file accessed by the user computer.

18. The method of claim 16 wherein in step (b) multiple entries may be entered for a same data file having different time ranges dependent on a time of day.

19. The method of claim 16 further including the step of providing a cache viewer for viewing the amount of cache predetermined in step (a) and the actual amount of cache being received during step (c).

20. A cache size table for storing data received during an audio file transmission comprising
   a uniform resource locator;
   a cache size amount; and
   a time range.

21. A program storage device readable by a machine, tangibly embodying a program of instructions executable by the machine to perform method steps for a method of receiving and processing an audio file via a server, said method steps comprising:
   (a) allocating an estimated amount of cache for the audio file;
   (b) adjusting the estimated amount of cache to an actual amount of cache; and
   (c) transmitting the audio file through a speaker linked to the machine such that a user of the machine may listen to the audio file without substantial breaks in transmission.

22. A program storage device readable by a machine, tangibly embodying a program of instructions executable by the machine to perform method steps for a method of receiving and processing an audio file by a server, said method steps comprising:
   (a) allocating an estimated amount of cache on a memory storage of the machine;
   (b) creating a cache size table comprising a uniform resource locator, a time range, and an actual amount of cache required to store the audio file, an entry corresponding to the audio file entered into said cache size table upon accessing the audio file;
   (c) adjusting the estimated amount of cache during processing of the audio file to the actual amount of cache such that a rate of accessing the audio file is substantially equal to a rate of processing the audio file; and
   (d) providing continuous transmission of the audio file to a user of the machine.

23. A program storage device readable by a machine, tangibly embodying a program of instructions executable by the machine to perform method steps for a method of receiving an audio file by a server, said method steps comprising:
   (a) providing a cache viewer on a screen linked to the machine;
   (b) allocating an estimated amount of cache for the audio file, the estimated amount of cache visible via the cache viewer;
   (c) creating a cache size table comprising a uniform resource locator, a time range and an actual amount of cache pertaining to the audio file;
   (d) displaying an actual amount of cache being received by the machine;
   (e) adjusting the estimated amount of cache to the actual amount of cache such that a rate of accessing the audio file is substantially equal to a rate of processing the audio file; and
   (f) providing substantially continuous transmission of the audio file to a user.

24. A program storage device readable by a machine, tangibly embodying a program of instructions executable by the machine to perform method steps for a method of controlling cache size during receipt of an audio data file, said method steps comprising:
   (a) allocating an estimated amount of cache for the audio data file;
   (b) creating a cache size table comprising entries for each audio data file accessed by the machine; and
   (c) modifying the estimated amount of cache to an actual amount of cache such that a rate of accessing the audio file data is substantially equal to a rate of receiving and processing the audio file data.

25. A web browser stored on a computer comprising
   a means for accessing an audio file, said audio file stored on a server linked to the computer;
   a means for reserving an estimated amount of cache storage for the audio file;
   a means for adjusting the estimated amount of cache storage to an actual amount of cache storage for the audio file such that the cache storage is not depleted when accessing the audio file;

a means for viewing the cache storage prior to adjusting the cache storage;

a means for creating a cache table comprising a uniform resource locator, a time range and an actual amount of cache storage pertaining to the audio file;

a means for comparing an entry for the audio file previously entered into the cache table with the estimated amount of cache storage such that the estimated amount of cache storage may be adjusted to provide continuous transmission of the audio file; and a means for transmitting the audio file to a listener.

26. A computer program product comprising a computer usable medium having computer readable program code means embodied in said medium for receiving and processing an audio file, said computer program product including:

computer readable program code means for causing a computer to allocate an estimated amount of cache for the audio file;

computer readable program code means for causing said computer to adjust the estimated amount of cache to an actual amount of cache; and computer readable program code means for causing said computer to transmit the audio file without substantial breaks in transmission.

27. A computer program product comprising a computer usable medium having computer readable program code means embodied in said medium for receiving and processing an audio file, said computer program product including:

computer readable program code means for causing a computer to allocate an estimated amount of cache;

computer readable program code means for causing said computer to create a cache size table comprising a uniform resource locator, a time range, and an actual amount of cache required to store the audio file;

computer readable program code means for causing said computer to create an entry in said cache size table corresponding to the audio file when the audio file is accessed;

computer readable program code means for causing said computer to adjust the estimated amount of cache during processing of the audio file to the actual amount of cache such that a rate of accessing the audio file is substantially equal to a rate of processing the audio file; and computer readable program code means for causing said computer to continuously transmit the audio file without significant gaps in transmission.

28. A computer program product comprising a computer usable medium having computer readable program code means embodied in said medium for receiving an audio file, said computer program product including:

computer readable program code means for causing a computer to provide a cache viewer on a display screen;

computer readable program code means for causing said computer to allocate an estimated amount of cache for the audio file and display the estimated amount of cache on the cache viewer;

computer readable program code means for causing said computer to create a cache size table comprising a uniform resource locator, a time range and an actual amount of cache pertaining to the audio file;

computer readable program code means for causing said computer to display an actual amount of cache being received;

computer readable program code means for causing said computer to adjust the estimated amount of cache to the actual amount of cache such that a rate of accessing the audio file is substantially equal to a rate of processing the audio file; and computer readable program code means for causing said computer to continuously transmit the audio file without significant gaps in transmission.

29. A computer program product comprising a computer usable medium having computer readable program code means embodied in said medium for controlling cache size during receipt of an audio data file, said computer program product including:

computer readable program code means for causing a computer to allocate an estimated amount of cache for the audio data file;

computer readable program code means for causing said computer to create a cache size table comprising entries for each audio data file accessed; and computer readable program code means for causing said computer to modify the estimated amount of cache to an actual amount of cache such that a rate of accessing the audio file data is substantially equal to a rate of receiving and processing the audio data file.

30. A computer program product comprising a computer usable medium having computer readable program code means embodied in said medium for browsing a web site having audio files, said computer program product including:

computer readable program code means for causing a computer to access an audio file via a web site;

computer readable program code means for causing said computer to reserve an estimated amount of cache storage for the audio file;

computer readable program code means for causing said computer to adjust the estimated amount of cache storage to an actual amount of cache storage for the audio file such that the cache storage is not depleted when accessing the audio file;

computer readable program code means for causing said computer to display the cache storage prior to adjusting the cache storage;

computer readable program code means for causing said computer to create a cache table comprising a uniform resource locator, a time range and an actual amount of cache storage pertaining to the audio file;

computer readable program code means for causing said computer to compare an entry for the audio file previously entered into the cache table with the estimated amount of cache storage such that the estimated amount of cache storage may be adjusted to provide continuous transmission of the audio file; and computer readable program code means for causing said computer to transmit the audio file.

* * * * *